(12) United States Patent
Tsuchida et al.

(10) Patent No.: US 7,953,300 B2
(45) Date of Patent: May 31, 2011

(54) IMAGE APPARATUS AND CAPTURED IMAGE RECORDING METHOD

(75) Inventors: Hiroyasu Tsuchida, Tokyo (JP); Manabu Ukai, Tokyo (JP)

(73) Assignee: Sony Corporation, Tokyo (JP)

( * ) Notice: Subject to any disclaimer, the term of this patent is extended or adjusted under 35 U.S.C. 154(b) by 903 days.

(21) Appl. No.: 11/869,448

(22) Filed: Oct. 9, 2007

(65) Prior Publication Data

US 2008/0131009 A1    Jun. 5, 2008

(30) Foreign Application Priority Data

Oct. 13, 2006    (JP) ................................. 2006-279942

(51) Int. Cl.
  *G06K 9/54*    (2006.01)
  *G06K 9/60*    (2006.01)
  *H04N 5/77*    (2006.01)
(52) U.S. Cl. ........................................ 382/305; 386/224
(58) Field of Classification Search .................. None
  See application file for complete search history.

(56) References Cited

U.S. PATENT DOCUMENTS

| | | | | |
|---|---|---|---|---|
| 5,081,538 A * | 1/1992 | Takei et al. | | 386/314 |
| 5,452,145 A * | 9/1995 | Wakui et al. | | 386/333 |
| 5,867,628 A * | 2/1999 | Sato et al. | | 386/225 |
| 6,327,423 B1 * | 12/2001 | Ejima et al. | | 386/225 |
| 7,148,883 B2 * | 12/2006 | Komatsu | | 345/182 |
| 7,382,972 B2 * | 6/2008 | Nakayama | | 386/328 |
| 7,483,061 B2 * | 1/2009 | Fredlund et al. | | 348/231.4 |
| 2002/0028075 A1 * | 3/2002 | Kazami et al. | | 396/387 |
| 2004/0120689 A1 * | 6/2004 | Yamasaki | | 386/46 |
| 2004/0141727 A1 * | 7/2004 | Daijo | | 386/96 |

FOREIGN PATENT DOCUMENTS

| | | |
|---|---|---|
| JP | 08-140047 | 5/1996 |
| JP | 09-023405 | 1/1997 |
| JP | 10-285545 | 10/1998 |
| JP | 2005-101836 | 4/2005 |
| JP | 2005-079823 | 8/2005 |

OTHER PUBLICATIONS

An Office Action for Japanese Patent Application 2006-279942 issued on Sep. 2, 2008.

* cited by examiner

*Primary Examiner* — Yuzhen Ge
(74) *Attorney, Agent, or Firm* — SNR Denton US LLP

(57) ABSTRACT

An imaging apparatus that records, on a recording medium, a moving image captured using a solid-state imaging device as stream data, is disclosed. The apparatus includes: an image encoding section that encodes data of the captured moving image with a unit of an image group being a sequence of images of a fixed number of frames; an input detection section that detects a recording stop request to stop recording of the stream data including the moving image data being an encoding result of the image encoding section onto the recording medium; and a recording control section that controls a recording operation of the stream data onto the recording medium such that, when the recording stop request is detected by the input detection section, the image group located immediately before the image group including an image captured at the time of detection is the last image group.

9 Claims, 8 Drawing Sheets

IMMEDIATELY AFTER COMMAND COMES FOR RECORDING STOP

DURING IMAGING

IMAGE APPARATUS AND CAPTURED IMAGE RECORDING METHOD

CROSS REFERENCES TO RELATED APPLICATIONS

The present invention contains subject matter related to Japanese Patent Application JP 2006-279942 filed in the Japanese Patent Office on Oct. 13, 2006, the entire contents of which being incorporated herein by reference.

BACKGROUND OF THE INVENTION

1. Field of the Invention

The present invention relates to an imaging apparatus and a captured image recording method for use to record, on a recording medium, moving images captured using a solid-state imaging device as stream data and, more specifically, to an imaging apparatus and a captured image recording method in a mode of encoding image data with a unit of an image group being a sequence of images of a predetermined number of frames.

2. Description of the Related Art

The recent imaging apparatus gaining rapid popularity, i.e., digital video camera, is of a type that captures moving images using a solid-state element, and records the moving images as digital data. The digital video camera of a previous type has often used a magnetic tape as a recording medium, and recorded moving images with DV (Digital Video) encoding. On the other hand, the digital video camera of a recent type performs recording with MPEG (Moving Picture Experts Group). Such a digital video camera with MPEG often uses a recording medium not only being a magnetic tape but also being an optical disk such as DVD (Digital Versatile Disk) and HDD (Hard Disk Drive), for example. Patent Document 1 (JP-A-2005-79823, paragraphs 0113 to 0120, and FIG. 16) describes an exemplary imaging apparatus using a DVD as a recording medium. At the time of DVD finalization, based on chapter information about any recorded moving image data, the imaging apparatus generates a top menu including a display area for reproduction of the respective chapters so that the user convenience is accordingly increased.

Image data being an MPEG encoding result is configured to include an I picture, a P picture, and a B picture. The I picture is an intra-frame encoded image, and the P picture is subjected to predictive encoding using an image preceding thereto. The B picture is subjected to predictive encoding using images preceding and subsequent thereto. With MPEG, such intra-frame predictive encoding is accordingly increasing the compression efficiency. With MPEG-2, a GOP (Group Of Pictures) unit is defined, which includes a plurality of pictures. A GOP at least includes one I picture, and this eases access during particular reproduction such as random access, fast forward, and fast rewind.

SUMMARY OF THE INVENTION

With most of the digital video cameras performing image recording with MPEG-2, for process simplification, the number of frames configuring a GOP is often fixed. If with a digital video camera using an optical disk under the DVD-Video standard, for example, a GOP is configured by 15 frames with NTSC (National Television Standards Committee), and by 12 frames with PAL (Phase Alternation by Line). The problem with such a fixed number of frames configuring a GOP is that, because recording of captured images has to be stopped at a boundary between the GOPs, the recording operation is not always stopped at a timing asked by a user for recording stop.

FIG. 7 is a diagram for illustrating a timing for stopping recording with a digital video camera of a previous type.

In FIG. 7, a timing T102 is a boundary between GOPs each including a plurality of frames, i.e., captured images. During recording of captured images onto a recording medium, when a user operation asks for stopping the recording at a timing T101, i.e., at some midpoint in the GOP preceding to the GOP for the timing T102, the image captured at the timing T101 will not be the last among the recorded images. In consideration thereof, with the previous digital video camera, when recording is asked to be stopped at the timing T101, recording on a recording medium is made up to the captured image of the frame located at the last of the GOP at the timing, and the actual recording stop timing is retarded until the timing T102 being the boundary with the immediately-subsequent GOP after the request for recording stop. Such timing retardation resultantly causes a problem of impairing the user's operability due to the reduced response to the user's operation, and a problem of recoding any images not expected by the user as will be described later.

FIGS. 8A and 8B are respectively a diagram showing an exemplary user's imaging operation during imaging and after a request for stopping image recording.

FIG. 8A shows the state of normal imaging, and a user 110 is holding a digital video camera 120. The user 110 directs the imaging surface to the side of an object while looking through a viewfinder, a monitor on the outer surface, or others. On the other hand, FIG. 8B shows an exemplary state immediately after the user 110 made an operation input asking for stopping image recording. As shown in FIG. 8B, after such an operation input made for recording stop, the user 110 often stops looking through the viewfinder, and brings down the hand holding the digital video camera 120.

The issue here is that, even after the operation is made for stopping image recording, when the actual recording operation is not stopped, the user bringing down his or her hand holding the digital video camera 120 causes recording of an image captured while the camera is moving, i.e., the imaging direction is changed. As a result, when the recorded images are reproduced, the image not expected by a user, e.g., image of ground, appears for a time period just before the end of the images, thereby considerably degrading the quality of image contents. What is more, when an object is a human being, for example, if the person notices that the user stops the recording operation, he or she may act as such, and thus any video that is not supposed to be recorded, i.e., showing the person' unintentional motion, is recorded.

If with NTSC of 30 frames per second, when a GOP has 15 frames, it means a delay of about 0.5 second at maximum under the control as above, i.e., until the recording is actually stopped after a request for recording stop is made. As such, displaying any unexpected video in a time period just before the recording operation is stopped is not negligible as a factor that degrades the quality of image contents.

It is thus desirable to provide an imaging apparatus and a captured image recording method that can prevent any possible quality degradation of images that is often observed just before the recording operation is stopped.

According to an embodiment of the present invention, there is provided an imaging apparatus that records, on a recording medium, a moving image captured using a solid-state imaging device as stream data. The apparatus includes: an image encoding section that encodes data of the captured moving image with a unit of an image group being a sequence of images of a fixed number of frames; an input detection section that detects, in response to an operation input made by a user, a recording stop request to stop recording of the stream data including the moving image data being an encoding result of the image encoding section onto the recording medium; and a recording control section that controls a recording operation of the stream data onto the recording medium such that, when the recording stop request is detected by the input detection section, the image group located immediately before the image group including an image captured at the time of detection of the recording stop request is the last image group in the stream data.

With such an imaging apparatus, data of images captured by imaging is encoded, by the image encoding section, with a unit of an image group being a sequence of images of a fixed number of frames. The resulting moving image data is recorded onto the recording medium as stream data. The input detection section detects, in response to an operation input made by a user, the recording stop request to stop the recording of the stream data onto the recording medium. When the recording stop request is detected by the input detection section, the recording control section controls the recording operation of the stream data onto the recording medium such that the image group located immediately before the image group including an image captured at the time of detection of the recording stop request is the last image group in the stream data.

With the imaging apparatus of the embodiment of the invention, when the recording stop request is issued with respect to stream data through user operation, the recording operation is stopped in such a manner that the image group located immediately before the image group including an image captured when the request is issued is the last image group in the stream data. This thus favorably prevents the recording operation of the captured images from continuing after the recording stop request is issued by user operation. As such, images not expected by the user are not recorded any more, thereby preventing quality degradation of the recorded images.

DETAILED DESCRIPTION OF THE INVENTION

In the below, an embodiment of the invention is described in detail by referring to the accompanying drawings.

Figure 1:
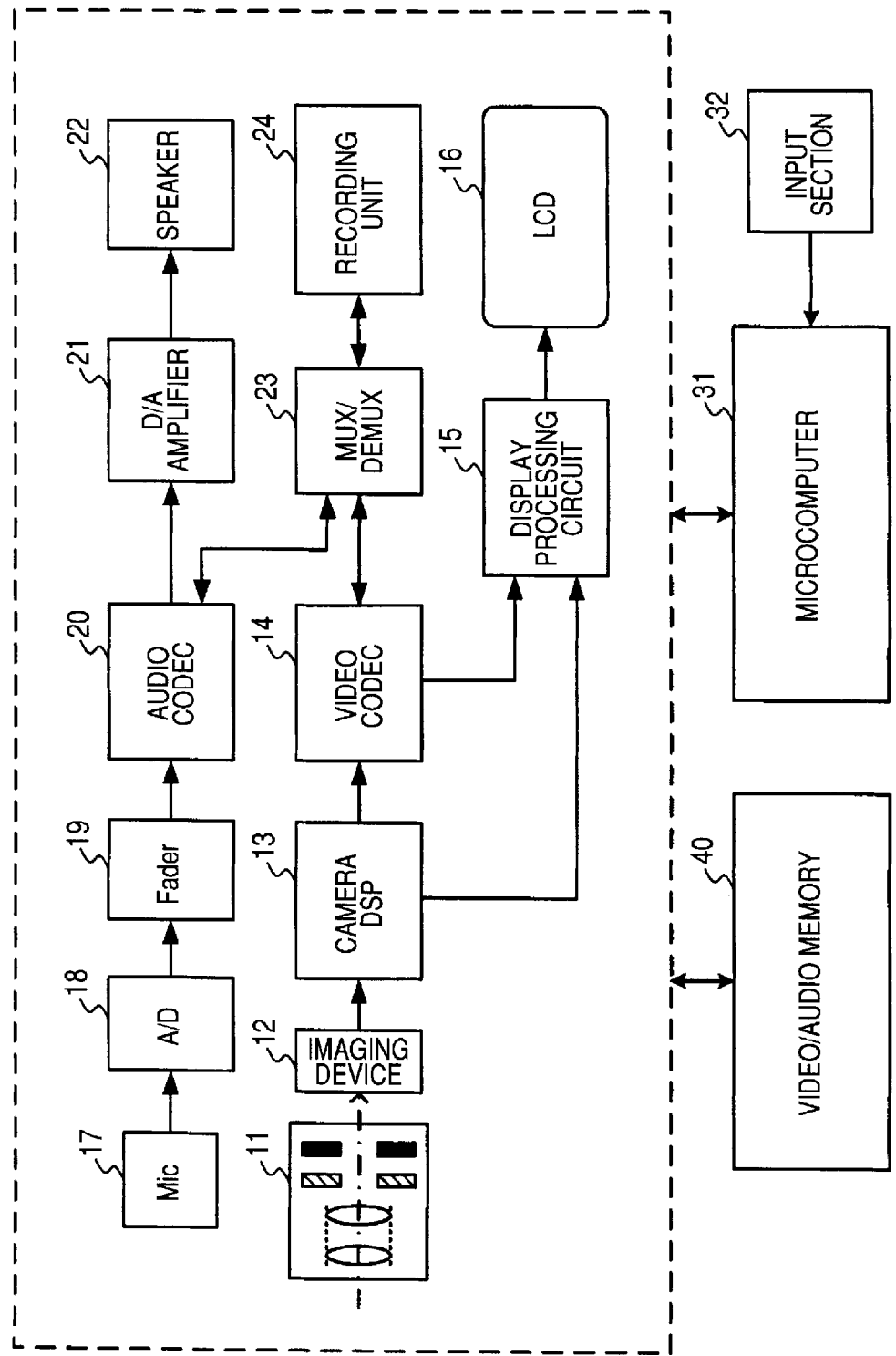
FIG. 1 is a block diagram showing the configuration of an imaging apparatus in an embodiment of the invention.

FIG. 1 is a diagram showing the configuration of an imaging apparatus in the embodiment of the invention.

The imaging apparatus of FIG. 1 is a so-called digital video camera, i.e., captures moving images, and records the captured images on a recording medium as digital data. This imaging apparatus is configured to include an optical block 11, an imaging device 12, a camera DSP (Digital Signal Processor) 13, a video CODEC (Coder/Decoder) 14, a display processing circuit 15, an LCD (Liquid Crystal Display) 16, a microphone 17, an A/D (Analog/Digital) converter 18, a fader 19, an audio CODEC 20, a D/A (Digital/Analog) converter/amplifier 21, a speaker 22, a MUX/DEMUX (Multiplexer/Demultiplexer) 23, a recording unit 24, a microcomputer 31, an input section 32, and a video/audio memory 40.

The optical block 11 is configured to include a lens, a drive mechanism, a shutter mechanism, an iris mechanism, and others. The lens serves to gather light coming from an object onto the imaging device 12, and the drive mechanism serves to move the lens for focusing and zooming. The imaging device 12 is a solid-state imaging device, and is exemplified by a CCD (Charge Coupled Device) or a CMOS (Complementary Metal-Oxide Semiconductor) image sensor. The imaging device 12 converts the light gathered by the optical block 11 into an electric signal.

The camera DSP 13 is under the control of the microcomputer 31, and goes through various types of analog and digital signal processing. The analog signal processing includes processing of CDS (Correlated Double Sampling) and AGC (Auto Gain Control) with respect to image signals coming from the imaging device 12, and others. The digital signal processing includes A/D conversion, processing of detection and image quality correction for imaging operation control, and others.

The video CODEC 14 is also under the control of the microcomputer 31, and applies compression encoding to image data provided by the camera DSP 13. The resulting image data is provided to the MUX/DEMUX 23 as a video ES (Elementary Stream). The video CODEC 14 also applies decompression decoding to the video ES provided by the MUX/DEMUX 23 after separation. In this embodiment, the video CODEC 14 is assumed as applying compression encoding and decompression decoding as such in accordance with MPEG-2.

The display processing circuit 15 converts image data into a signal for use of image display. The image data here is the one provided by the camera DSP 13, or the one provided by the video CODEC 14 after decompression decoding. The image signal being the conversion result is forwarded to the LCD 16 from the display processing circuit 15, and the LCD 16 then displays thereon images being captured or any reproduced images of data recorded on the recording unit 24.

The microphone 17 gathers audio signals. The A/D converter 18 subjects, to digital conversion, the audio signals collected by the microphone 17 with a predetermined sampling rate so that audio PCM (Pulse Code Modulation) data is generated. The fader 19 is under the control of the microcomputer 31, and processes the audio PCM data provided by the A/D converter 18, i.e., applies fade-out processing of reducing the audio level of the data by degrees.

The audio CODEC 20 is also under the control of the microcomputer 31, and encodes the audio PCM data provided via the fader 19 in accordance with any predetermined compression encoding, e.g., MPEG. The resulting data is provided to the MUX/DEMUX 23 as an audio ES. The audio CODEC 20 also applies decompression decoding to the audio ES provided by the MUX/DEMUX 23 after separation.

The D/A converter/amplifier 21 converts, into an analog signal, the audio data being the result of decompression decoding by the audio CODEC 20. The D/A converter/amplifier 21 also amplifies the audio signal being the conversion result, and outputs the amplification result to the speaker 22 so that audio is reproduced and output.

The MUX/DEMUX 23 is under the control of the microcomputer 31, and packetizes the video ES coming from the video CODEC 14 and the audio ES coming from the audio CODEC 20. The MUX/DEMUX 23 multiplexes the resulting packets so that a PS (Program Stream) is generated for output to the recording unit 24. The MUX/DEMUX 23 also separates the video and audio ESs from the PS read from the recording unit 24, and forwards the separation results to the video CODEC 14 and the audio CODEC 20, respectively.

The recording unit 24 is a device for recording stream data (PS) of video/audio generated by the MUX/DEMUX 23, and is implemented by a drive unit for use with a portable recording medium such as magnetic tape and an optical disk, or an HDD, for example. The recording unit 24 is also capable of reading the recorded PS for supply to the MUX/DEMUX 23.

The microcomputer 31 is provided with a CPU (Central Processing Unit), and a memory such as ROM (Read Only Memory) or RAM (Random Access Memory). The microcomputer 31 runs any program stored in the memory, thereby exercising control entirely over the imaging apparatus. The input section 32 forwards, to the microcomputer 31, a control signal corresponding to the operation input made by a user through operation of an input key or others (not shown).

The video/audio memory 40 is shared for use as a buffer area for image and audio data when the data is subjected to processing of recording and reproduction. This video/audio memory 40 is exemplified by SDRAM (Synchronous Dynamic RAM) and others.

When recording of image and audio data is performed in such an imaging apparatus, data of captured images through with the processing by the camera DSP 13 is forwarded to the display processing circuit 15. In response, images being captured are displayed on the LCD 16, and data of the captured images is supplied also to the video CODEC 14 so that compression encoding, i.e., encoding, is executed. As such, a video ES is generated. The audio CODEC 20 encodes data of any collected audio, thereby generating an audio ES. The MUX/DEMUX 23 multiplexes the video ES and the audio ES being the generation results so that a PS is generated. The resulting PS is recorded as a data file onto the recording unit 24.

On the other hand, to reproduce the PS recorded on the recording unit 24, the PS read from the recording unit 24 as such is separated by the MUX/DEMUX 23, and the video ES after separation is subjected to decompression decoding by the video CODEC 14. The image data being the decoding result is supplied to the display processing circuit 15, and the LCD 16 accordingly displays thereon the reproduced image. The audio ES being the separation result of the MUX/DEMUX 23 is decoded by the audio CODEC 20, and the decoded audio data is supplied to the D/A converter/amplifier 21. In this manner, the speaker 22 outputs audio.

Described next is the processing to be performed to stop recording of image and audio data in this imaging apparatus. In the imaging apparatus, the image and audio data is recorded onto the recording unit 24 as MPEG-2 stream data (PS). At the time of recording, the image data is encoded with a unit of a GOP, which is configured by pictures of a plurality of frames. The number of frames in a GOP is always fixed. In this embodiment, presumably, image recording is performed with NTSC with 30 frames per second, and a GOP carries therein 15 frames.

As such, because the number of frames in a GOP is fixed, the timing of stopping recording of image data (video ES) never fails to come at the tail end of the GOP. Accordingly, recording of audio data is also stopped with data, i.e., audio frame, corresponding to the image data at the tail end of the GOP. With the imaging apparatus in this embodiment, basically, when an operation input made by a user comes to the input section 32 asking for recording stop, the image being captured at that timing is used as a reference to determine a recording stop timing for the image data, i.e., determine a boundary with the GOP immediately preceding to the current GOP as a recording stop timing for the image data. This thus enables to prevent recording of any user's unintended images until the recording of image data is actually stopped after a request for recording stop is made.

Alternatively, as will be described later, when a recording stop request comes from a user, a determination may be first made about an image being captured at that timing is located where in a GOP. Based on the result determined as such, the actual timing of stopping data recording may be set to the tail end of the GOP, or to the tail end of the GOP immediately preceding thereto. Such timing setting enables to reduce as much as possible the time difference until the recording is actually stopped after a request for recording stop is made, whereby the user's operability can be increased.

Figure 2:
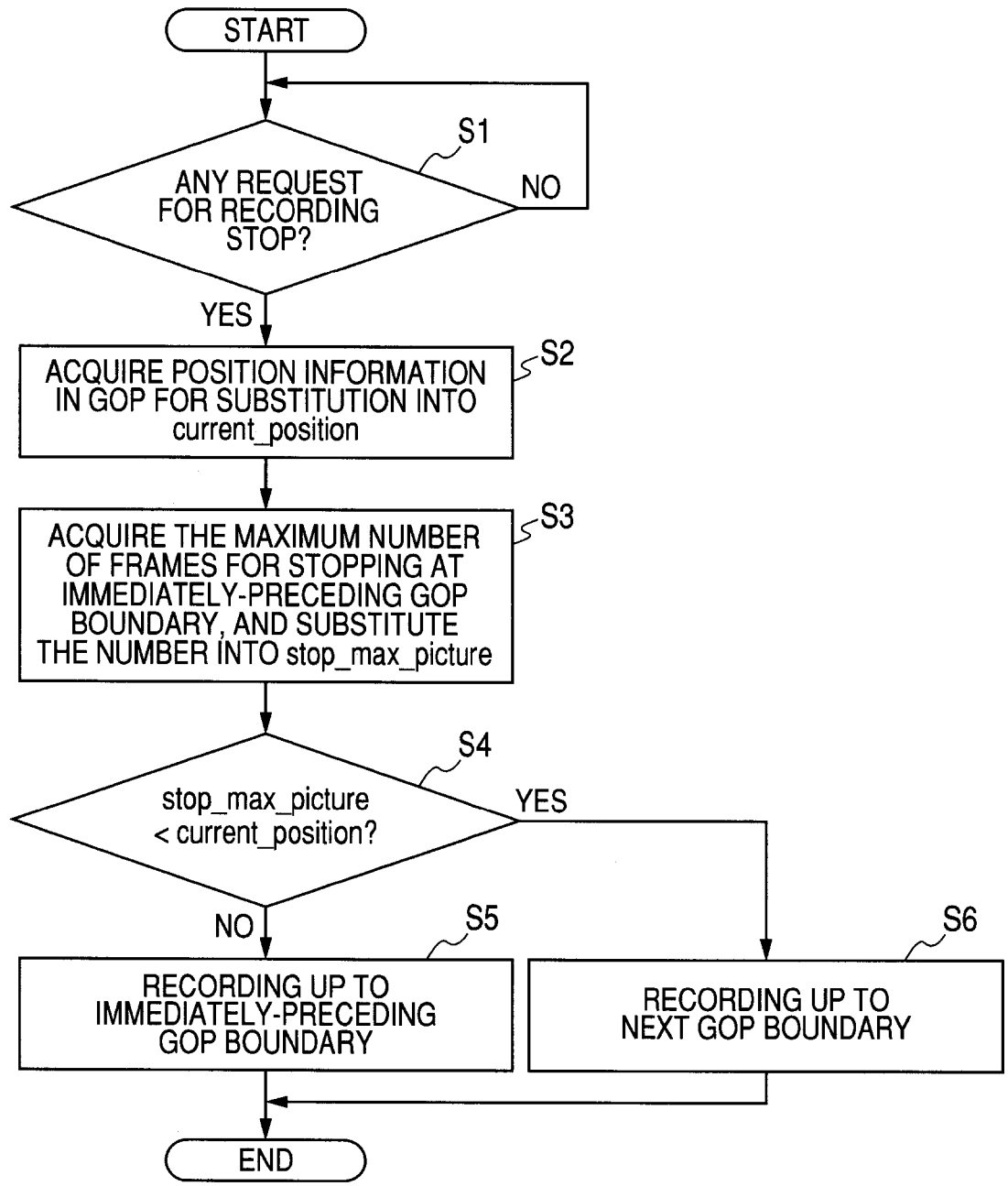
FIG. 2 is a flowchart showing the process procedure when recording of image data is stopped.

FIG. 2 is a flowchart showing the process procedure when recording of image data is stopped. The process of this flowchart is executed when data of any captured images is recorded on the recording unit 24.

Step S1: The microcomputer 31 determines whether a recording stop request is made by a user through detection of a control command, i.e., recording stop command, provided by the input section 32 asking for recording stop. When the determination result is Yes, the procedure goes to step S2.

Step S2: The microcomputer 31 acquires information about the position in a GOP of an image currently being captured, and substitutes the position information into current_position. This position information is specifically about the frame number indicating where the image data provided by the imaging device 12 is located from the head of the GOP. The position information is acquired based on a synchronizing signal or others for use to drive the imaging device 12 and the camera DSP 13, for example.

Step S3: The microcomputer 31 acquires the maximum frame number for use to stop data recording at a boundary with the immediately-preceding GOP, and substitute the information into stop_max_picture. This maximum frame number is preferably set to an intermediate value of the number of frames configuring a GOP, and herein, the number is exemplarily set to "7".

Step S4: The microcomputer 31 compares the value of stop_max_picture and the value of current_position. When the value of current_position is equal to or smaller than the value of stop_max_picture, the procedure goes to step S5. On the other hand, when the value of current_position is larger than the value of stop_max_picture, the procedure goes to step S6.

Step S5: The microcomputer 31 applies control to make a timing for stopping data recording comes at the boundary with the immediately-preceding GOP.

Step S6: The microcomputer 31 applies control to make a timing for stopping data recording comes at the boundary with the immediately-subsequent GOP.

Figure 3:
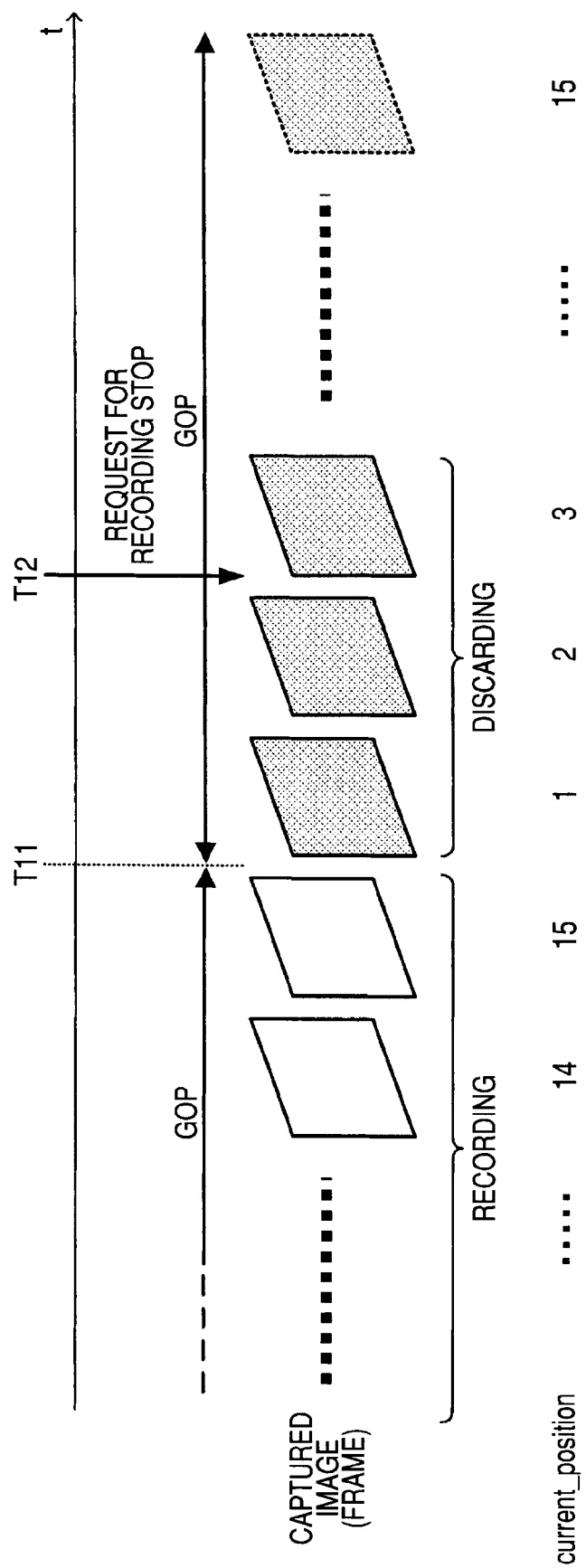
FIG. 3 is a diagram for illustrating a recording stop operation when a value of current_position is equal to or smaller than a value of stop_max_picture.

FIG. 3 is a diagram for illustrating a recording stop operation when the value of current_position is equal to or smaller than the value of stop_max_picture.

In FIG. 3, a timing T11 is corresponding to the boundary of GOPs, and the value of current_position corresponding to an image captured at this timing T11 is reset to "1". Assumed here is a case where, in an imaging period of the GOP started at the timing T11, a recording stop request is made by a user at a timing T12 where the value of current_position is "7" or smaller. In this case, the timing T11 being at the tail end of the preceding GOP is set to a timing for stopping data recording. That is, data of images captured before the timing T11 is recorded on the recording unit 24, and data of images captured after the timing T11 and being currently processed in the imaging apparatus is discarded. Such an operation favorably prevents recording of any user's unintended images after a request for recording stop is made by a user.

Figure 4:
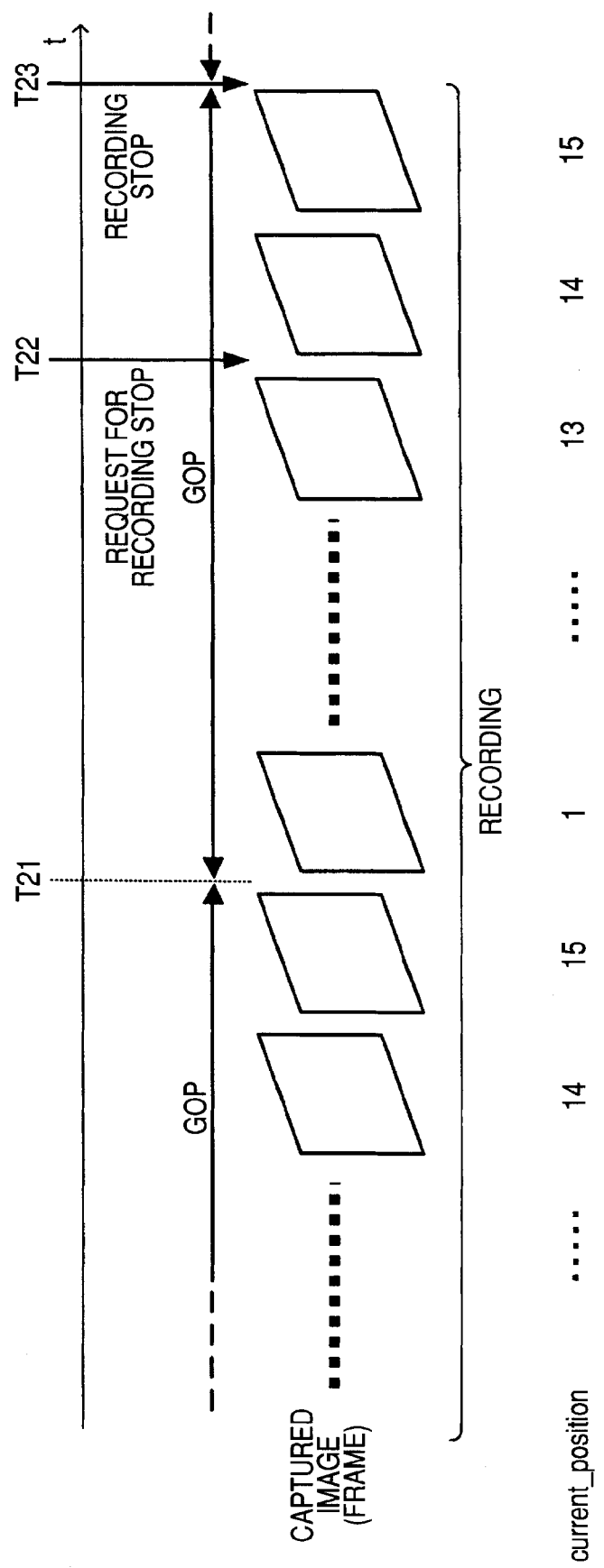
FIG. 4 is a diagram for illustrating the recording stop operation when the value of current_position is larger than the value of stop_max_picture.

FIG. 4 is a diagram for illustrating a recording stop operation when the value of current_position is larger than the value of stop_max_picture.

In FIG. 4, a timing T21 is corresponding to the boundary of any two GOPs, and a timing T23 is corresponding to the boundary with another subsequent GOP. Assumed here is a case where, in an imaging period of the GOP started at the timing T21, a user's recording stop request is made at a timing T22 where the value of current_position is "8" or larger. In this case, the timing T23 being at the tail end of the GOP being in the recording process is set to a timing for stopping data recording. That is, even after the timing T22, recording is continued to record data of images captured until the timing T23 onto the recording device 24.

Such an operation enables to suppress a time lag between a user's recording stop request and the actual stopping of data recording, i.e., down to, at the maximum, about ¼ second being about a half of the previous time lag. As such, the user's operability can be increased, and the probability of recording any user's unintended images after a request for recording stop is made can be reduced.

Note here that the value of stop_max_picture is fixed in the above exemplary processing. Alternatively, the value may be arbitrarily changed through a user's operation in a range where the number of frames in a GOP takes a maximum value.

Described next is the operation procedure for stopping the data recording as described above, including the procedure of stopping recording of not only image data but also audio data. First of all, FIG. 5 is a block diagram showing the configuration of function blocks in a recording system for image and audio data.

Figure 5:
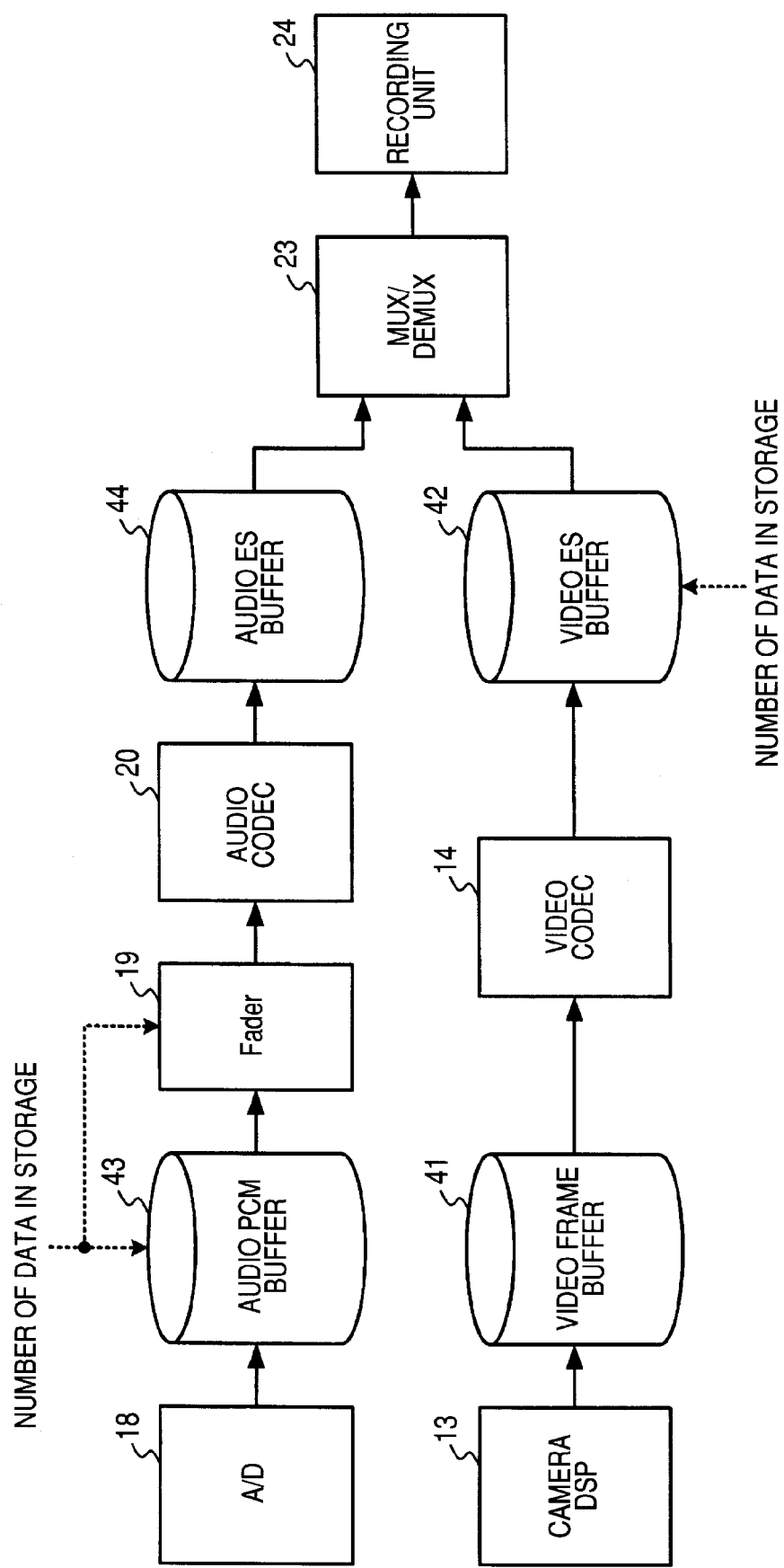
FIG. 5 is a block diagram showing the configuration of function blocks in a recording system for image and audio data.

As shown in FIG. 5, image data, i.e., video baseband data, acquired by imaging of the imaging device 12 and processed by the camera DSP 13 is temporarily stored in a video frame buffer 41, and then is read out to the video CODEC 14 for encoding. A video ES generated by the video CODEC 14 is temporarily stored in a video ES buffer 42, and then is read out to the MUX/DEMUX 23 for multiplexing over a PS.

On the other hand, audio collected by the microphone 17 is converted by the A/D converter 18 into digital audio data, i.e., audio PCM data. The resulting digital audio data is temporarily stored in an audio PCM buffer 43, and then is read out to the audio CODEC 20 via the fader 19. Herein, just before the recording of audio data is stopped, the fader 19 goes through a process of gradually reducing the audio level. An audio ES as a result of compression encoding by the audio CODEC 20 is temporarily stored in the audio ES buffer 44, and then is read out to the MUX/DEMUX 23 for multiplexing over a PS.

Note that, in this embodiment, memory areas respectively corresponding to the buffers, i.e., the video frame buffer 41, the video ES buffer 42, the audio PCM buffer 43, and the audio ES buffer 44, are assigned into a video/audio memory 40. Alternatively, these memory areas may be assigned to each different memory unit. In the actual configuration, the MUX/DEMUX 23 is also provided with a buffer for use to store therein any incoming video ESs and audio ESs. The MUX/DEMUX 23 starts multiplexing of the ESs when the buffer is provided with all of needed data, thereby being able to generate a PS with synchronization between the image and audio data.

Considered now is a case where the operation of stopping data recording described by referring to FIGS. 2 to 4 is implemented in such a configuration. In the operation, when a recording stop request is made, an image lastly captured actually at the timing is sometimes included in other images captured before the timing. As such, there needs delay the process of multiplexing, i.e., perform data buffering at some point in the recording system before the image and audio data is multiplexed as PSs.

For timing adjustment of image data for determining which image is to be lastly captured for recording, writing and reading of video ESs is controlled in the video ES buffer 42. That is, even if an image to be actually lastly recorded is located at a position in the past, to enable multiplexing of image data up to the position over PSs without fail, any needed amount of image data (video ESs) is previously stored in the video ES buffer 42. As such, when the storage number of pieces of image data after compression encoding is used as a basis to determine the position of recording stop, any needed capacity of the buffer can be reduced compared with a case of using the storage number of pieces of image data before compression encoding.

In the embodiment, the operation as above is implemented by the microcomputer 31 always monitoring the data amount of video ESs needed to be in the video ES buffer 42, and adjusting, when a recording stop command is detected, the data amount needed in the video ES buffer 42 in accordance with the position in a GOP of an image being captured at the time of detection.

In this example, the needed amount of data to be stored in the video ES buffer 42 is represented as the storage number of pieces of data with a unit of a video frame.

On the other hand, for audio data, as described above, the fade-out processing is to be performed just before the data recording is stopped, thereby increasing the quality of audio data for recording. The concern here is that such fade-out processing is required to be performed to audio data before compression encoding by the audio CODEC 20. As such, the timing adjustment for synchronizing the recording stop position of the audio data to the image data is made through control over writing and reading of the audio data, i.e., audio PCM data, in the audio PCM buffer 43.

In the embodiment, the microcomputer 31 always monitors the data amount of the audio data needed to be in the audio PCM buffer 43, and adjusts, when a recording stop command is detected, the data amount needed in the audio PCM buffer 43 in accordance with the position in a GOP of an image being captured at the time of detection. In this example, the needed amount of data is represented as the storage number of pieces of data with a unit of a video frame.

Figure 6:
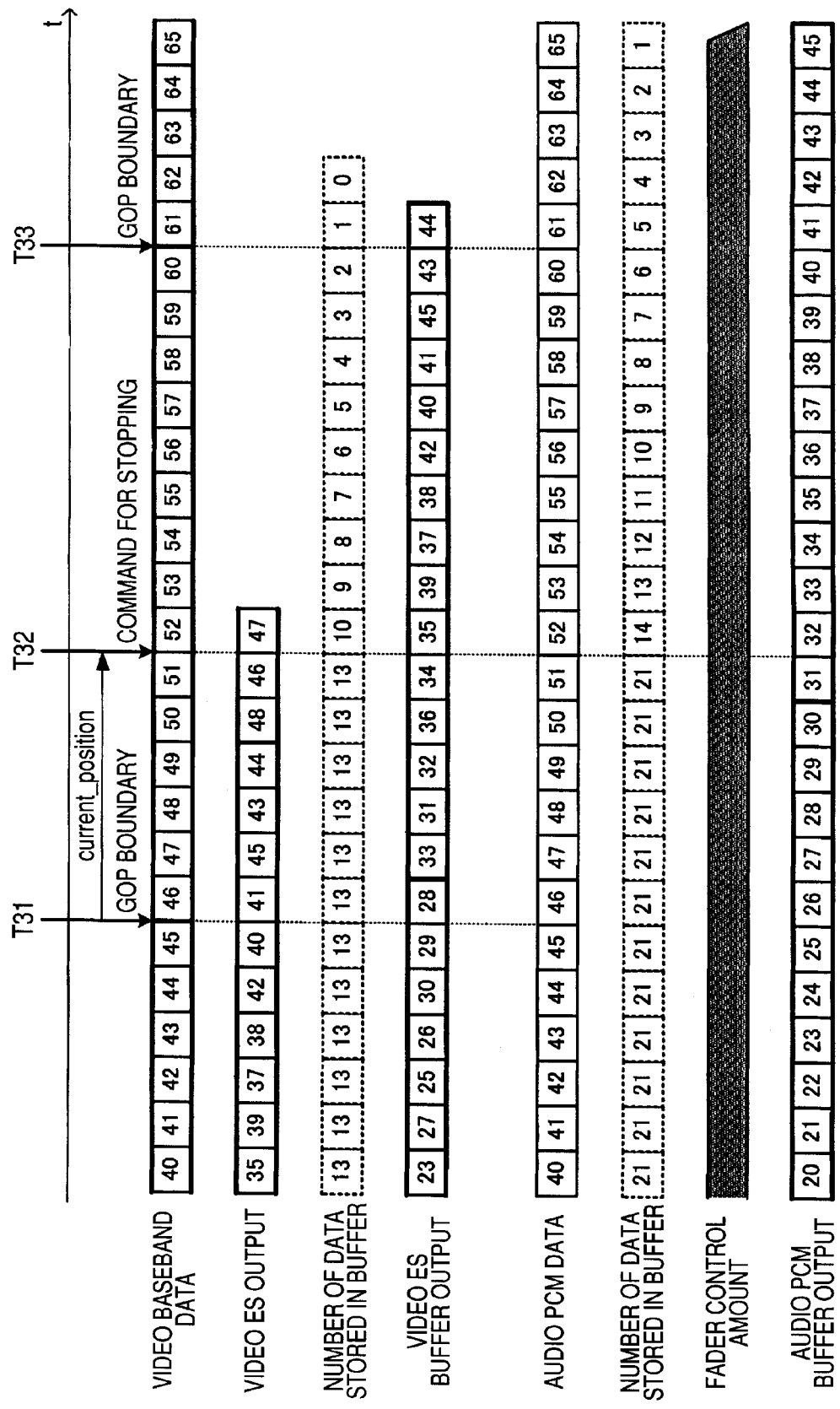
FIG. 6 is a timing diagram showing a recording stop operation for image and audio data when a request for recording stop is made.
Figure 7:
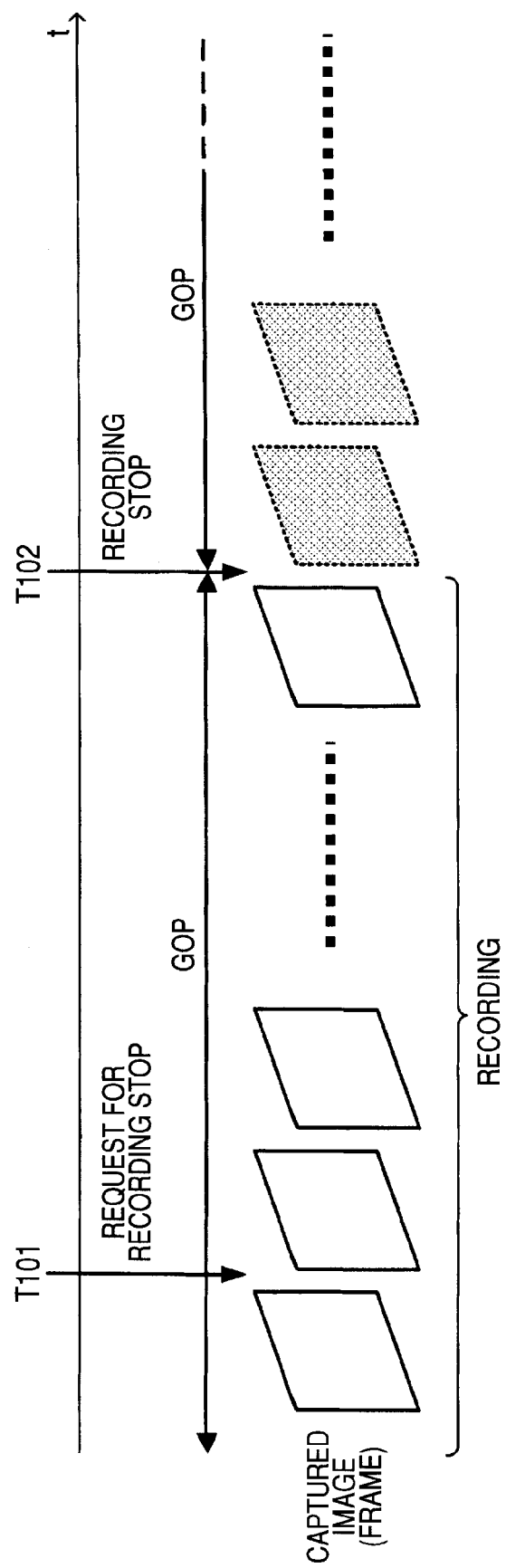
FIG. 7 is a diagram for illustrating a timing for stopping recording with a digital video camera of a previous type.
Figure 8B:
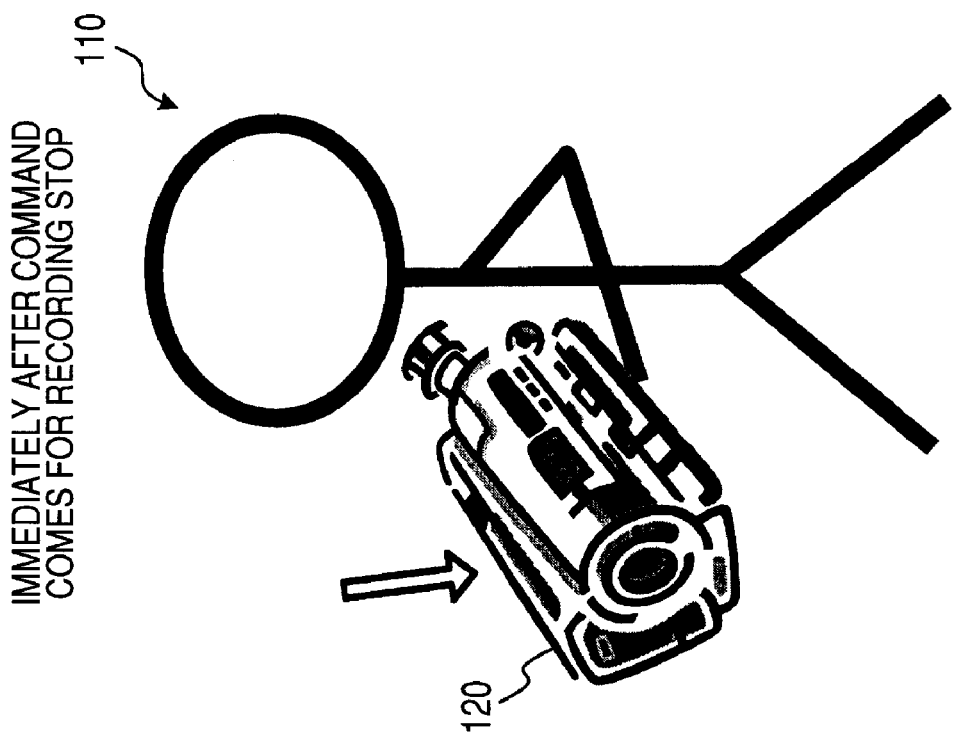
FIGS. 8A and 8B are respectively a diagram showing an exemplary user's imaging operation during imaging and after a request for stopping image recording.
Figure 8A:
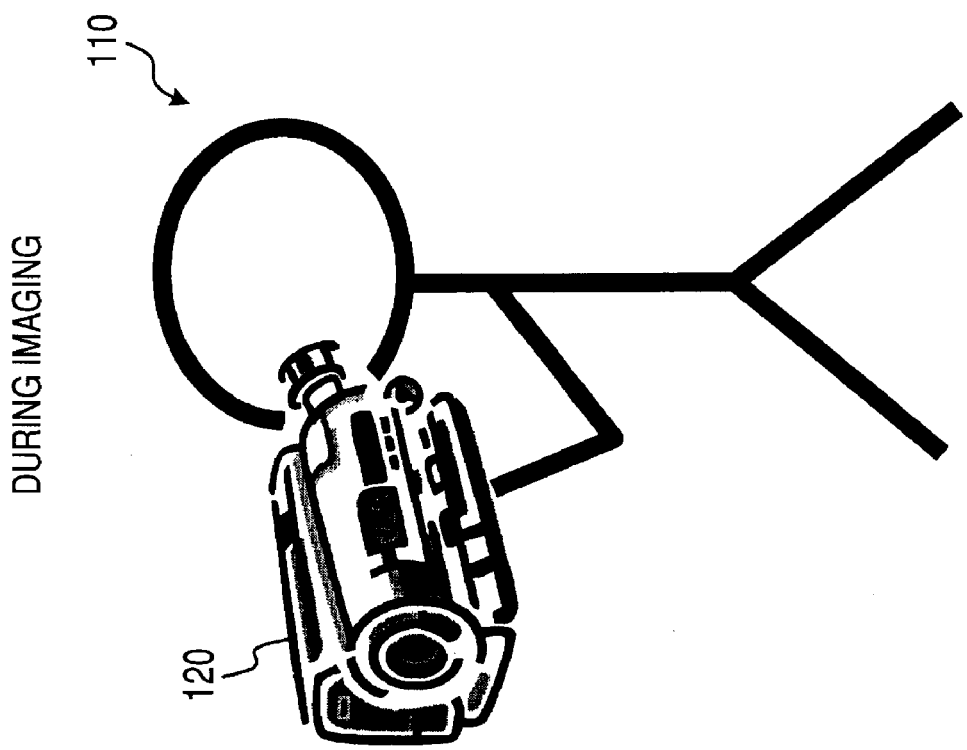

FIG. 6 is a timing diagram showing a recording stop operation for image and audio data when a request for recording stop is made.

In FIG. 6, data of images captured by imaging is each assigned a frame number in order of imaging from the head.

Audio data is assigned a frame number for every audio frame. The frame numbers in the audio data are corresponding to those in the video baseband data. In the drawing, video baseband data is assumed as being image data to be output after being subjected to A/D conversion inside of the camera DSP 13, for example. Also in the drawing, audio PCM data is assumed as being audio data to be provided from the A/D converter 18 in synchronization with an A/D conversion timing of the image data, and as being denoted by an audio frame unit.

In FIG. 6, exemplified is a case where image data with frame numbers of "31" to "45", image data with frame numbers of "46" to "60", and image data with frame numbers of "61" to "75" (not shown) are each controlled to configure a GOP after encoding. Accordingly, in this example, timings T31 and T33 where the image data with the frame numbers of "46" and "61" are respectively output are each a boundary of GOPs on the sequence of captured images. Note here that the order of pictures in a video ES is assumed as I, B, B, P, B, B, P, and others. For example, the image data with the frame numbers of "48", "46", and "47" are encoded as pictures of I, B, and B, respectively.

When the video baseband data is supplied to the video CODEC 14 via the video frame buffer 41, and when the resulting data is output as a video ES after compression encoding, the output timing is assumed as being delayed by four frames, for example. In the video ES buffer 42, during any normal recording operation, the microcomputer 31 is controlling the video ES buffer 42 in terms of storage number of pieces of video ESs generated by the video CODEC 14, e.g., to always keep hold of 13 frames (including a video frame currently being written and read out). As such, more delay of 12 frames is caused between the input image data to the video ES buffer 42 and the output image data from this buffer.

In consideration thereof, considered now is a case where a recording stop request is made through user operation at a timing T32 where the image data with the frame number of "52" is output. In this case, the image data with the frame number of "52" is located at the 7th of the images of the current GOP, and it means that the value of current_position, i.e., 7, is equal to or smaller than the value of stop_max_picture, i.e., 7. Accordingly, the image data to be lastly recorded onto the recording unit 24 is the image data with the frame number of "45", which is the last frame of the GOP immediately preceding to the current GOP.

After the image data to be lastly recorded is defined by position as such, the microcomputer 31 stops the compression encoding in the video CODEC 14, and changes the storage number of pieces of data in the video ES buffer 42 in accordance with the value of current_position. In FIG. 6 example, in the video ES buffer 42, video ESs corresponding to the no-need-to-record image data with the frame numbers of "48", "46", and "47" are through with writing or yet in the process of writing. Therefore, in order to remove such video ESs from the video ES buffer 42, "3" is deducted from the storage number of pieces of data to make the amount "10". Thereafter, every time a video ES of a frame is output from the video ES buffer 42, the storage number of pieces of data is decremented by 1. In this manner, the image data with the frame number of "45" in the video baseband data can be the one to be lastly recorded.

Note here that when such a delay of four frames is observed for the output of the video ESs, if the value of current_position is equal to or smaller than "4", it means that there is no video ES that is supposed to be discarded in the video ES buffer 42. Therefore, in this case, the microcomputer 31 monitors a GOP boundary for the image data to be written into the video ES buffer 42, and at the point in time when the image data exceeds the GOP boundary, i.e., in this example, at the point in time when writing of the image data with the frame number of "48" is started with respect to the video ES buffer 42, the decrement of storage number of piece of data is started for the video ES buffer 42.

In this example, the number of frames for the video ES buffer 42 to normally keep therein is assumed as being "13". However, when the value of stop_max_picture is "7", an image to be lastly recorded is not defined by position for a time period until, in the video baseband data, the number of frames from the GOP boundary exceeds "8". There thus needs to make the video ES buffer 42 store therein the minimum number of pieces of video ESs to be generated before the point in time.

As such, if there is no such a delay observed in the output of the video ESs, it means that the video ES buffer 42 is required to always keep therein the video ES of 7 frames at the minimum. On the other hand, when there is such a delay observed in the output of the video ESs, the number of pieces of data for the video ES buffer 42 to keep can be reduced by the number of frames of the delay.

Note that when the value of current_position becomes larger than the value of stop_max_picture, the microcomputer 31 may monitor a GOP boundary of image data to be written into the video ES buffer 42, and at the time point when the image data exceeds the next GOP boundary, i.e., in this example, at the time point when writing of image data with the frame number of "63" (I picture) is started with respect to the video ES buffer 42, the storage number of pieces of data may be started being decremented in the video ES buffer 42.

Described next is an operation of stropping recording of audio data. As described in the foregoing, for audio data, the timing adjustment for synchronizing the recording stop position of the audio data to the image data is made through control over writing and reading of the audio PCM data in the audio PCM buffer 43.

In FIG. 6 example, in the audio PCM buffer 43, during any normal recording operation, the microcomputer 31 is controlling the audio PCM data provided by the A/D converter 18 in terms of storage number of pieces of data, e.g., to always keep hold of 21 frames (including an audio frame currently being written and read out). As such, a delay of 20 frames is caused between the input image data to the audio PCM buffer 43 and the output image data from this buffer.

In consideration thereof, considered now is a case where a recording stop request is made at the timing T32. In this case, similarly to the image data, the position of audio data to be lastly recorded to the recording unit 24 will be at the audio data with the frame number of "45". After the audio data to be lastly recorded is defined position as such, the microcomputer 31 makes the A/D converter 18 stop in operation, and the value of current_position is deducted from the storage number of pieces of data in the audio PCM buffer 43. Thereafter, every time the audio PCM data of an audio frame is output from the audio PCM buffer 43, the storage number of pieces of data is decremented one by one. That is, at the point in time immediately after the timing T32, in the audio PCM buffer 43, the no-need-to-record audio data with the frame numbers of "46" to "52" are through with writing or yet in the process of writing. As such, by changing the storage number of pieces of data as described above, such unneeded audio data can be discarded.

When the storage number of pieces of data in the audio PCM buffer 43 reaches "1", the microcomputer 31 starts gradually reducing the output volume of the fader 19 at a predetermined timing, and controls the volume to be "0" in value when the corresponding audio frame is completely output. This accordingly enables to subject the fade-out-processed audio data to compression encoding in the audio CODEC 20 so that the resulting video stream can be recorded with audio data high in quality.

Note that when the value of current_position becomes larger than the value of stop_max_picture, the microcomputer 31 may set the value derived by deducting the value of current_position from the number of frames in a GOP, i.e., "7", to the storage number of pieces of data in the audio PCM buffer 43. Thereafter, every time an output of the audio PCM data of an audio frame comes from the audio PCM buffer 43, the storage number of pieces of data may be decremented one by one. Similarly to the above, the fade-out processing just before the recording is stopped may be executed when the storage number of pieces of data in the audio PCM buffer 43 reaches "1".

Described in the above embodiment is the case of applying the invention to a digital video camera, but this is surely not restrictive. The invention is applicable to various types of electronic equipment similarly provided with capabilities of recording moving images and audio, e.g., digital still camera, mobile phone, personal digital assistant, and others.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus that records, on a recording medium, a moving image captured using a solid-state imaging device as stream data, the apparatus comprising:
   an image encoding section that encodes data of the captured moving image with a unit of an image group being a sequence of images of a fixed number of frames;
   an input detection section that detects a recording stop request issued in response to an operation input made by a user to stop recording of the stream data including the moving image data being an encoding result of the image encoding section onto the recording medium; and
   a recording control section that controls a recording operation of the stream data onto the recording medium such that, when the recording stop request is detected by the input detection section, the image group located immediately before the image group including an image captured at the time of detection of the recording stop request is the last image group in the stream data,
   wherein,
      when the recording stop request is detected by the input detection section, the recording control section determines which position in the image group the image captured at the time of detection is located, and
      the recording operation of the stream data is controlled such that, (a) when the image captured at the time of detection of the recording stop request is located at a position corresponding to or prior to a predetermined maximum frame number which is less than the fixed frame number from the head of the sequence of the image group, the image group located immediately before the image group is the last image group of the stream data, and (b) when the image captured at the time of detection of the recording stop request is located at a position later than the maximum frame number from the head of the sequence of the image group, the image group is the last image group in the stream data.

2. The imaging apparatus according to claim 1, further comprising an encoded image buffer for temporarily storing the moving image data being the encoding result of the image encoding section,
   wherein,
      when the recording stop request is detected by the input detection section, the recording control section discards, from the encoded image buffer, the moving image data of the image group including the image captured at the time of detection of the recording stop request.

3. The imaging apparatus according to claim 1, wherein the maximum frame number is set to a substantially intermediate value of the fixed number of frames.

4. The imaging apparatus according to claim 1, wherein the maximum frame number can be arbitrarily set in response to an user operation to the extent of the fixed number of frames at a maximum.

5. The imaging apparatus according to claim 1, wherein the image encoding section adopts compression encoding with which interframe predictive encoding is possible, and performs the compression encoding to make the image group located immediately before include one or more interframe encoded image.

6. The imaging apparatus according to claim 1, further comprising:
   an audio collection section that collects audio;
   an audio digital conversion section that converts an audio signal being a collection result into digital data;
   a volume adjustment section that converts audio data provided by the audio digital conversion section to change a volume level of the audio data,
   wherein,
      the recording control section controls such that (a) the audio data provided via the volume adjustment section is multiplexed into the stream data together with the corresponding moving image data encoded by the image encoding section and recorded on the recording medium, and (b) when the recording stop request is detected by the input detection section, the volume adjustment section converts the audio data corresponding to the last image group in the stream data such that the volume level of the audio data gradually decreases from immediately before the tail end position of the image group and becomes 0 at the tail end position.

7. The imaging apparatus according to claim 6, further comprising an audio buffer that temporarily stores therein the audio data provided by the audio digital conversion section,
   wherein,
      when the recording stop request is detected by the input detection section, the recording control section discards, from the audio buffer, the audio data corresponding to the imaging group including the image captured at the time of detection of the recording stop request.

8. The imaging apparatus according to claim 7, further comprising an audio encoding section that compresses and encodes the audio data provided by the audio buffer via the volume adjustment section,
   wherein,
      the recording control section controls such that the audio data being a compression encoding result of the audio encoding section is multiplexed into the stream data together with the moving image data which corresponds to the audio data and is the encoding result of the image encoding section.

9. A captured image recording method of recording, on a recording medium, a moving image captured using a solid-state imaging device as stream data, the method comprising the steps of:

encoding, by an image encoding section, data of the captured moving image with a unit of an image group being a sequence of images of a fixed number of frames;

detecting, by an input detection section, a recording stop request issued in response to an operation input made by a user to stop recording of the stream data including the moving image data being an encoding result of the image encoding section onto the recording medium; and controlling, by a recording control section, a recording operation of the stream data onto the recording medium such that, when the recording stop request is detected by the input detection section, the image group located immediately before the image group including an image captured at the time of detection the recording stop request is last image group in the stream data, wherein, when the recording stop request is detected by the input detection section, the recording control section determines which position in the image group the image captured at the time of detection is located, and the recording operation of the stream data is controlled such that, (a) when the image captured at the time of detection of the recording stop request is located at a position corresponding to or prior to a predetermined maximum frame number which is less than the fixed frame number from the head of the sequence of the image group, the image group located immediately before the image group is the last image group of the stream data, and (b) when the image captured at the time of detection of the recording stop request is located at a position later than the maximum frame number from the head of the sequence of the image group, the image group is the last image group in the stream data.

* * * * *